Oct. 23, 1973  RISUKE SUZUKI  3,767,753
METHOD OF PRODUCING A THIN PLASTIC DIAL PLATE AND
IN PARTICULAR A PLASTIC DATE WHEEL
Filed June 23, 1971                                        4 Sheets-Sheet 1

INVENTOR
RISUKE SUZUKI

BY    MICHAEL S. STRIKER
             ATTORNEY

Oct. 23, 1973   RISUKE SUZUKI   3,767,753
METHOD OF PRODUCING A THIN PLASTIC DIAL PLATE AND
IN PARTICULAR A PLASTIC DATE WHEEL
Filed June 23, 1971   4 Sheets-Sheet 2

INVENTOR
RISUKE SUZUKI

BY   MICHAEL S. STRIKER

ATTORNEY

United States Patent Office 3,767,753
Patented Oct. 23, 1973

3,767,753
METHOD OF PRODUCING A THIN PLASTIC DIAL PLATE AND IN PARTICULAR A PLASTIC DATE WHEEL
Risuke Suzuki, 4–2, 2-chome, Mamada, Ichikawa-shi, Chiba-ken, Japan
Filed June 23, 1971, Ser. No. 155,885
Int. Cl. B29c 25/00
U.S. Cl. 264—138
10 Claims

ABSTRACT OF THE DISCLOSURE

This invention relates to a method of producing a thin plastic dial plate and in particular a plastic date wheel equipped in the mechanism of the wrist-watch and comprises a process of injection-molding said dial plate united with an external or internal circular brim frame or a circular disk instead of said brim frame in order to improve the flow of plastic resin in the injection-molding and dissolve the unevenness and the warp in the annealing, a process of annealing said molded article under non-confinement, a process of cutting off said brim frame or said disk from said dial plate and a process of annealing said cut dial plate under confinement. Therefore, this invention may provide a light thin plastic dial plate instead of a heavy metallic plate for the meters and may cheaply mass-produce it.

---

This invention relates to a method of producing a thin plastic dial plate and in particular a plastic date wheel equipped in the mechanism of the wrist-watch.

One object of this invention is to provide a light thin plastic dial plate instead of a heavy metallic dial plate for the meters so as to operate easily the mechanism of them.

Another object of this invention is to provide a thin plastic dial plate cheaply produced by injection-molding for the meters.

Heretofore, the thin dial plate, particularly the date wheel has been produced from brass or aluminium plate. But it is not desirable that the dial plate is heavy for the mechanism of the meters. Therefore a plastic dial plate has been considered instead of the metallic one. As a method of producing it, there is an injection-molding which produces plastic goods. But there are various difficulties to prevent the enterprise of it in the injection-molding. One of them is that the dial plate needs to be extremely thin and high precise. For example, the date wheel needs to be about 0.3 mm. thick in general and such the plastic dial plate belongs to the thinnest article produced by injection-molding. But the available plastic date wheel has not been produced by conventional injection-molding. As the molded dial plate has properly the residual stress, it is deformed by the ageing change and gets out of order at the dimensions. The date wheel needs particularly to be the highest precise plane as a condition of its application in the mechanism of the wrist-watch. Therefore, the annealing is considered that the injection-molded article is confined in a precise mold comprising the upper and the lower members and is annealed. But such the annealing mold is much high priced and the annealing process requires much trouble, therefore it is not practical for the production of the plastic dial plate, particularly the plastic date wheel.

This invention has been accomplished to improve the injection-molding and the annealing for the plastic dial plate. Briefly stated in accordance with one aspect of this invention, there is provided a method of providing a precise thin plastic dial plate, particularly a plastic date wheel, comprising an injection molding process which molds a dial plate having a circular brim frame or rim outside the circumference of said dial plate or having an internal circular brim frame inside the aperture of said dial plate or having an internal circular disk in the aperture of said dial plate, a preliminary annealing process which anneals said molded article under non-confinement at the slightly lower temperature than that of a finishing annealing described hereinafter, a cutting process which cuts off said brim frame or said internal disk from said molded article and the finishing annealing process which anneals said cut dial plate under confinement between two polished metallic planes while charging an appropriate weight on said dial plate at the slightly higher temperature than that of the preliminary annealing, consecutively.

The invention will be better understood and other objects and additional advantages of the invention will become apparent upon perusal of the following description taken in connection with drawings, in which figures are explanatory for working the method of this invention.

Figure 1:
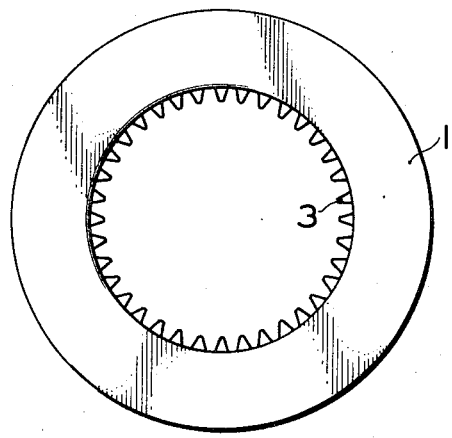
FIG. 1 is an enlarged plan view of a plastic date wheel as a finished article of this invention.
Figure 2:
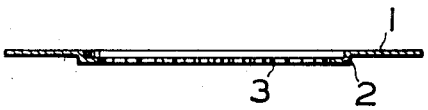
FIG. 2 is an enlarged elevational section cut at the middle of FIG. 1.
Figure 3:
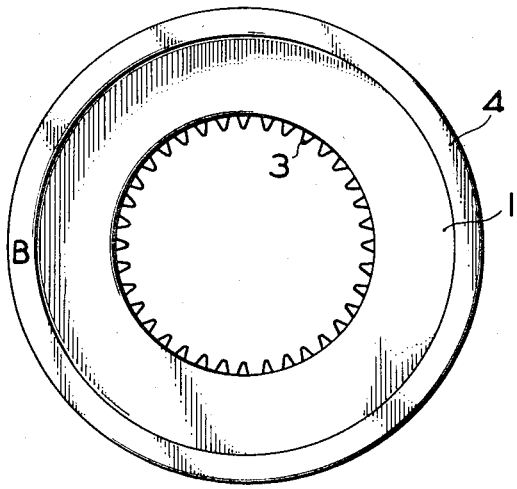
FIG. 3 is an enlarged plan view of a molded raw plastice date wheel thereof.
Figure 4:
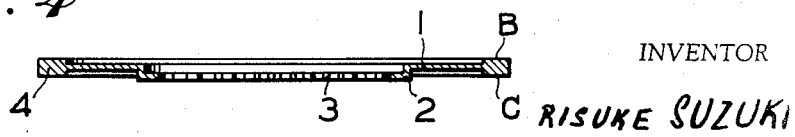
FIG. 4 is an enlarged elevational section cut at the middle of FIG. 3.

Referring first to the preferred form of the invention shown in FIGS. 1 to 4, inclusively, there are illustrated a finished plastic date wheel comprising a circular dial plate 1 having a wide circular aperture, a projection portion 2 slightly projecting from the surface of said plate 1 at the circumference of said aperture of said plate 1 and an internal gear 3 attached to the inside of said projection portion 2 as shown in FIGS. 1 and 2, and a molded raw date wheel comprising said circular dial plate 1, said projection portion 2, said internal gear 3 and besides a circular brim frame or rim 4 as shown in FIGS. 3 and 4. The numerals of the date on said dial plate may be printed at the definite interval on the circular dial plate 1 by the traditional method. In this invention, the injection-mold of the date wheel is designed to produce a plastic article shown in FIGS. 3 and 4, so that said molded article comprises an actual dial plate 1 having a projection portion 2 and an internal gear 3, and a circular brim frame 4. Said brim frame 4 is ring-shaped and has a rectangular section of the requisite width and thickness and is cut off from the dial plate 1 after the preliminary annealing, but it plays an important part in this invention as detailed hereinafter. It is difficult to produce directly a plastic dial plate of 0.3 mm. thickness as shown in FIGS. 1 and 2 by ordinary injection-molding, for molten resins cannot be completely injected and filled into the cavity of the mold corresponding to FIGS. 1 and 2. If it is intended to fill up a plastic resin in such a cavity of the mold, it is necessary that the temperature of the mold, the pressure of injection and the temperature of the molten plastic resin are greatly increased and besides the injection speed is made faster than that of the ordinary injection-molding, and the runner and the gate in the mold are made larger than those of the ordinary injection-molding. But the problems of the weld line, the internal stress and the deformation in the date wheel have eventually not been solved even by the above altered molding. This invention has been able to overcome these difficulties by improving the injection-mold and the annealing processes. Namely, this invention improved the flow of molten resins by employing a mold which comprises the cavity corresponding to FIGS. 1 and 2 and the cavity corresponding to a circular brim frame 4 so as to mold an article shown in FIGS. 3 and 4. Said brim frame 4 is made thicker than the projection portion 2, accordingly said mold has a large volume of the cavity corresponding to said brim frame 4. Therefore, in respect of the flow of a molten resin, this invention is different gates into the cavity of said brim frame 4 and next flows directly from a small opening of the gate to the cavity of a dial plate. By means of the mold of this invention, the molten resin is first injected from the plurality of the gates into the cavity of said brim frame 4 and next flows smoothly and uniformly into the cavity of said dial plate 1 from the circumference and consecutively flows into the cavity of said projection portion 2 and the cavity of said internal gear 3. Therefore the pressure of injection, the temperature of the mold and the temperature of molten resin in this invention may be the same as in the ordinary molding. And the dial plate 1 which is united with the brim frame 4 may be molded without making the weld line on it. Thus the problem of the flow of molten resin has been solved. The date wheel also needs to be as level as possible. But it is inevitable that a molded plastic plate and particularly the extremely thin plastic plate warp front or back later from a little internal stress. This invention has solved the problem of the evenness in the dial plate 1 by molding it together with the circular brim frame 4 and by twice annealing it. However, the dimension of the brim frame 4 is a decisive factor in respect to the evenness of the thin plastic plate. In the case of the production of the mold in this invention, the shrinkage and the warp of the dial plate must considered and the trial moldings must be operated several times while amending the cavity of the circular brim frame 4 in a provisional mold. While inspecting trial molded articles, said mold may be corrected as follows. If said trial molded dial plate 1 is convex upward in FIG. 4, Plane B in the cavity of said brim frame 4 must be shaved a little. Then the dial plate molded by the corrected mold is made flat. If said trial molded dial plate is concave downward in FIG. 4, Plane C in the cavity of the brim frame 4 must be shaved a little. Then the dial plate molded by the corrected mold is made flat. As stated above, the correction of the provisional mold is completed by shaving Plane B or C of the cavity corresponding to the brim frame 4 in said mold while inspecting the evenness of the trial molded dial plate 1. Thus the provisional mold may be corrected to a practical mold which is able to mold a precise flat dial plate. The molten plastic resin may be injected into the mold from the plurality of gates attached to the cavity corresponding to the brim frame 4 and the molded dial plate may be released by thrusting the brim frame 4, therefore marks or scars do not remain on the surface of the dial plate 1. Next, the molded raw dial plate must be annealed to prevent the deformation, particularly the unevenness of it, from the ageing change. The preliminary annealing is operated for said molded raw dial plate that it is placed a large number once on the horizontal metallic plane and is annealed at the comparatively lower temperature under non-confinement. In the annealing process, shrinkage of the molded article occurs as a matter of course. But the circular brim frame 4 supports the circular dial plate 1 so as to prevent the unevenness and the warp in said dial plate 1. Therefore such a plate as the extremely thin dial plate 1 is maintained to be flat without yielding the wave-like unevenness or warp. After the preliminary annealing, the brim frame 4 is cut off from the dial plate 1 by a pressing or shaving process. Next, said cut dial plate 1 is subjected to the finishing annealing as follows. Many said cut dial plates 1 are placed one another at a distance on the polished metallic planar plate, and another metallic planar plate is placed on said cut dial plates 1 so as to charge some weight on each said dial plate 1. Said dial plates 1 are annealed under such confinement in a heater.

There are many plastic resins available for the injection-molding, but the most useful synthetic resins in this inventon are polyacetal resin, various nylon resins and polycarbonate resin. In the injection molding employing polyacetal resin, it is melted at the temperature of about 190° C. and the mold is heated at the temperature of 75±5° C. A dial plate 1 shown in FIGS. 1 to 4 is 0.3 mm. thick and 24 mm. of the outside diameter and 16 mm. of the inside diameter, and a circular brim frame 4 show in FIGS. 3 and 4 is about 0.7 mm. thick and about 2 mm. wide, accordingly about 28 mm. of the outside diameter. After such dial plate 1 united with said brim frame 4 is injection-molded and released from the mold, it is left for 24 hours at the normal temperature and next is annealed at the temperature 80±5° C. for 60 to 90 minutes under non-confinement in a heater and then is removed from the heater and cooled. Said brim frame 4 is cut off from said dial plate 1 by shaving or pressing. Many said cut dial plates 1 are again entered in the heated and annealed at the temperature of 110±5° C. under confinement charging about 150 g. weight on each said plate 1 for about 10 hours. After the annealing, said dial plates 1 are made cool slowly and pulled out from the heater. Thus the date wheel available to the mechanism of the wrist-watch was produced. An appearance of the date wheel produced by this invention is good, not damaged and not deformed. After it was preserved for several months, it was tested at regular intervals in respect of the ageing change, but the deformation was scarcely detected. The test of said date wheel is shown as follows.

The evenness is complete and the ageing change is not detected within one year after the production. The shrinkage coefficient in each the process is shown as the ratio of the shrinkage of the date wheel to the dimension of the mold at the normal temperature.

TABLE OF SHRINKAGE

| Process | Molding | Preliminary annealing | Finishing annealing |
| --- | --- | --- | --- |
| Coefficient, percent | 1.6 | 1.9 | 2.2 |

Figure 5:
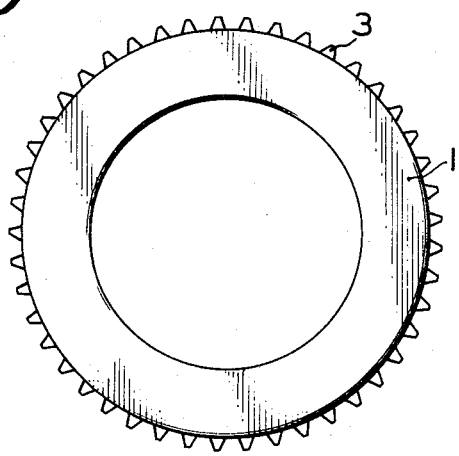
FIG. 5 is an enlarged plan view of a finished plastic gear thereof.
Figure 6:
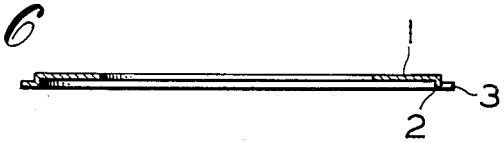
FIG. 6 is an enlarged elevational section cut at the middle of FIG. 5.
Figure 7:
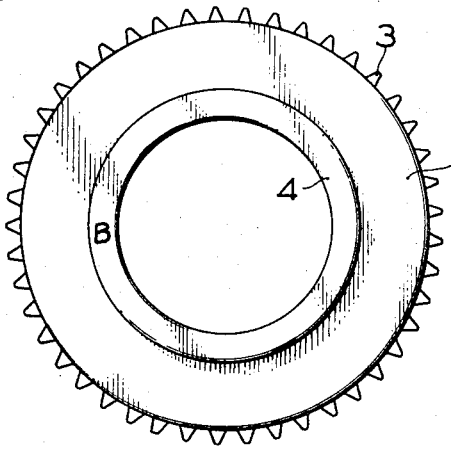
FIG. 7 is an enlarged plan view of a molded raw gear of FIG. 5.
Figure 8:
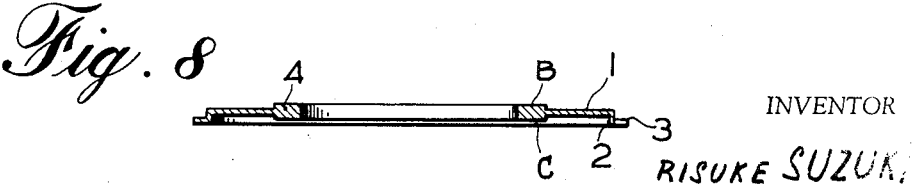
FIG. 8 is an enlarged elevational section cut at the middle of FIG. 7.
Figure 9:
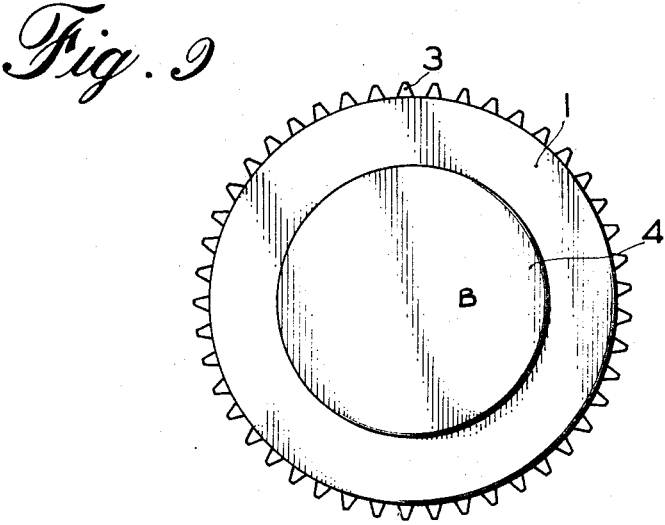
FIG. 9 is an enlarged plan view of another molded raw gear of FIG. 5.
Figure 10:
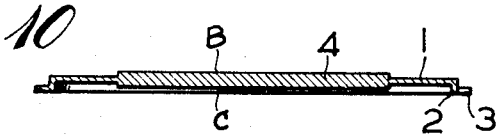
FIG. 10 is an enlarged elevational section cut at the middle of FIG. 9.
Figure 11:
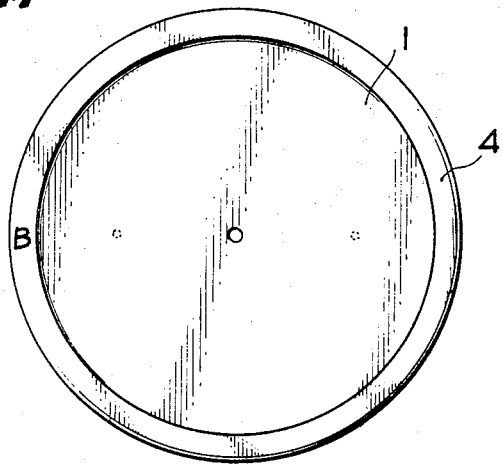
FIG. 11 is an enlarged plan view of a molded raw plastic dial plate having stopper bosses thereof.
Figure 12:
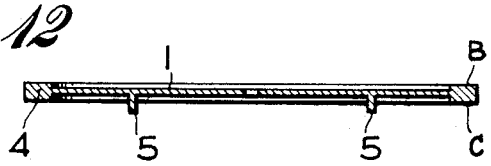
FIG. 12 is an enlarged elevational section cut at the middle of FIG. 11.
Figure 13:
FIG. 13 is an enlarged plan view of a finished plastic dial plate of FIG. 11.
Figure 14:
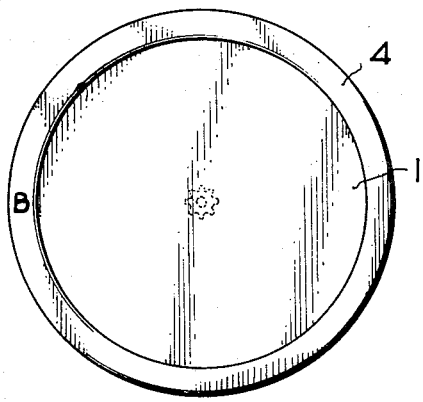
FIG. 14 is an enlarged plan view of a molded raw plastic day wheel having a pinion produced thereby.
Figure 15:
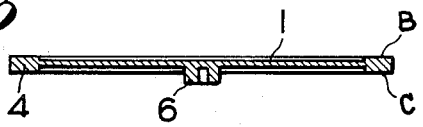
FIG. 15 is an enlarged elevational section cut at the middle of FIG. 14.
Figure 16:
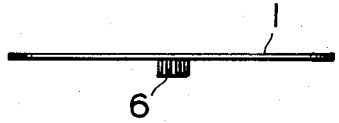
FIG. 16 is an enlarged elevational view of a finished day wheel of FIG. 14.

As described above, one embodiment of this invention concerning the production of the plastic date wheel of the wrist-watch has been detailed, but this invention may also be applied to the production of a thin circular plastic plate 1 having a projection portion 2 and an external gear 3 shown in FIGS. 5 and 6. This embodiment is carried out by adopting the following method. As shown in FIGS. 7 and 8, a thin circular plate 1, which is provided with an aperture of a required diameter in the center of it and a circular brim frame 4 of the appropriate width and thickness attached to the inside of said aperture, is injection-molded. Also as shown in FIGS. 9 and 10, a thin circular plastic plate 1, which is provided with an aperture of a required diameter and a circular disk 4 having the appropriate thickness instead of the circular brim frame 4, is injection-molded. The processes for the production of the circular plate shown in FIGS. 5 and 6 are the same as described above. Regarding other applications of this invention, there are productions of a plastic dial plate 1 having a stopper boss 5 as shown in FIGS. 11 to 13 and a plastic day wheel of the wrist-watch having a pinion 6 beneath the center of said day wheel as shown in FIGS. 14 to 16. These productions comprise the same processes as described above by injection-molding the actual dial plate 1 united with the circular brim frame 4 or the circular disk 4.

Furthermore, various extremely thin circular plastic plates wihch have the highest precision and have not the ageing change may be produced by this invention.

While particular embodiments of the inventions have been illustrated and described, modification thereof will readily occur to those skilled in the art. It should be understod therefore that the invention is not limited to the particular arrangements and methods disclosed but that the appended claims are intended to cover all modifications which do not depart from the true spirit and scope of the invention.

What is claimed as new and desired to be secured by Letters Patent of the United States is:

1. A method of making a thin plastic dial plate, particularly for time pieces and the like, comprising the steps of injection molding a resinous material in the shape of an article including a substantially annular plate portion having an inner and an outer periphery and a rim extending along one of said peripheries and of one piece with said plate portion, the thickness of said rim being substantially greater than the thicknes sof said plate portion; annealing said article at a lower first temperature for a predetermined length of time under non-confining conditions; severing said rim from said plate portion; sandwiching said plate portion between juxtaposed planar smooth surfaces of two confining elements; annealing said plate portion at a higher second temperature for a predetermined length of time; and thereafter slowly cooling said plate portion.

2. A method as defined in claim 1, wherein said rim is substantially annular and is encircled by said inner periphery.

3. A method as defined in claim 1, wherein said rim is substantially disc-shaped and is encircled by said inner periphery.

4. A method as defined in claim 1, wherein the step of molding said resinous material comprises injection molding of polyacetal resin.

5. A method as defined in claim 1, wherein said rim encircles said outer periphery.

6. A method as defined in claim 1, wherein said rim has a width greater than its thickness.

7. A method as defined in claim 1, wherein said rim is at least partially molded prior to molding of said plate portion.

8. A method as defined in claim 1, further comprising the step of curing said article at substantially room temperature for substantially 24 hours prior to the step of annealing at said first temperature.

9. A method as defined in claim 4, wherein the step of annealing at said first temperature comprises subjecting said article to a temperature of substantially 75–85° C. for substantially 60–90 minutes.

10. A method as defined in claim 4, wherein the step of annealing at said second temperature comprises subjecting said plate portion to a temperature of substantially 105–115° C. for substantially 10 hours.

References Cited
UNITED STATES PATENTS 2,386,976  10/1945  Putnam _____ 264—346

ROBERT F. WHITE, Primary Examiner

T. P. PAVELKO, Assistant Examiner

U.S. Cl. X.R.

264—235, 328, 346